United States Patent
Chang et al.

(10) Patent No.: US 9,151,873 B2
(45) Date of Patent: Oct. 6, 2015

(54) ACTINICALLY-CROSSLINKABLE AMPHIPHILIC PREPOLYMERS

(71) Applicant: Novartis AG, Basel (CH)

(72) Inventors: Frank Chang, Cumming, GA (US); Manivakkam J. Shankernarayanan, Alpharetta, GA (US)

(73) Assignee: Novartis AG (CH)

( * ) Notice: Subject to any disclaimer, the term of this patent is extended or adjusted under 35 U.S.C. 154(b) by 0 days.

(21) Appl. No.: 14/105,295

(22) Filed: Dec. 13, 2013

(65) Prior Publication Data

US 2014/0171543 A1 Jun. 19, 2014

Related U.S. Application Data

(60) Provisional application No. 61/737,187, filed on Dec. 14, 2012.

(51) Int. Cl.
| | | |
|---|---|---|
| *G02B 1/04* | (2006.01) | |
| *C08G 73/02* | (2006.01) | |
| *C08G 77/452* | (2006.01) | |
| *C08G 18/61* | (2006.01) | |
| *C08G 18/75* | (2006.01) | |

(52) U.S. Cl.
CPC .............. *G02B 1/043* (2013.01); *C08G 18/61* (2013.01); *C08G 18/755* (2013.01); *C08G 73/0233* (2013.01); *C08G 73/0246* (2013.01); *C08G 77/452* (2013.01)

(58) Field of Classification Search
CPC ................................. G02B 1/043; G08G 18/10
USPC .......................................................... 523/107
See application file for complete search history.

(56) References Cited

U.S. PATENT DOCUMENTS

| | | | |
|---|---|---|---|
| 4,444,711 | A | 4/1984 | Schad |
| 4,460,534 | A | 7/1984 | Boehm |
| 4,485,236 | A | 11/1984 | Rasmussen |
| 5,527,925 | A | 6/1996 | Chabrecek |
| 5,583,163 | A | 12/1996 | Muller |
| 5,612,389 | A | 3/1997 | Chabrecek |
| 5,612,391 | A | 3/1997 | Chabrecek |
| 5,621,018 | A | 4/1997 | Chabrecek |
| 5,665,840 | A | 9/1997 | Poehlmann |
| 5,712,356 | A | 1/1998 | Bothe |
| 5,807,944 | A | 9/1998 | Hirt |
| 5,843,346 | A | 12/1998 | Morrill |
| 5,849,841 | A | 12/1998 | Muehlebach |
| 5,894,002 | A | 4/1999 | Boneberger |
| 5,936,052 | A | 8/1999 | Bothe |
| 6,039,913 | A | 3/2000 | Hirt |
| 6,165,408 | A | 12/2000 | Steinmann |
| 6,218,508 | B1 | 4/2001 | Kragh |
| 6,221,303 | B1 | 4/2001 | Steinmann |
| 6,303,687 | B1 | 10/2001 | Mueller |
| 6,342,570 | B1 | 1/2002 | Bothe |
| 6,472,489 | B1 | 10/2002 | Stockinger |
| 6,479,587 | B1 | 11/2002 | Stockinger |
| 6,492,478 | B1 | 12/2002 | Steinmann |
| 6,627,124 | B1 | 9/2003 | Herbrechtsmeier |
| 6,800,225 | B1 | 10/2004 | Hagmann |
| 7,091,283 | B2 | 8/2006 | Mueller |
| 7,238,750 | B2 | 7/2007 | Mueller |
| 7,268,189 | B2 | 9/2007 | Mueller |
| 7,384,590 | B2 | 6/2008 | Kelly |
| 7,387,759 | B2 | 6/2008 | Kelly |
| 7,566,754 | B2 | 7/2009 | Mueller |
| 7,956,135 | B2 | 6/2011 | Hirt |
| 8,003,710 | B2 | 8/2011 | Medina |
| 8,044,111 | B2 | 10/2011 | Chang |
| 8,048,968 | B2 | 11/2011 | Phelan |
| 8,071,658 | B2 | 12/2011 | Zhou |
| 8,071,696 | B2 | 12/2011 | Hirt |
| 8,071,703 | B2 | 12/2011 | Zhou |
| 8,088,313 | B2 | 1/2012 | Hagmann |
| 8,211,955 | B2 | 7/2012 | Chang |
| 8,263,679 | B2 | 9/2012 | Zhou |
| 8,283,429 | B2 | 10/2012 | Zhou |
| 8,835,525 | B2 * | 9/2014 | Kuyu et al. ................... 523/107 |
| 2004/0082680 | A1 | 4/2004 | Phelan |
| 2005/0113549 | A1 | 5/2005 | Devlin |
| 2008/0015315 | A1 | 1/2008 | Chang |

(Continued)

FOREIGN PATENT DOCUMENTS

| | | |
|---|---|---|
| EP | 0958315 B1 | 6/2001 |
| EP | 0932635 B1 | 7/2001 |

(Continued)

OTHER PUBLICATIONS

PCT International Search Report dated May 26, 2014, International Application No. PCT/US2013/074895, International Filing Date Dec. 13, 2013.

PCT Written Opinion of the International Searching Authority dated May 26, 2014, International Application No. PCT/US2013/074895, International Filing Date Dec. 13, 2013.

Authors: Jun Cui, Melissa A. Lackey, Ahmad E. Madkour, Erika M. Saffer, David M. Griffin, Surita R. Bhatia, Alfred J. Crosby and Gregory N. Tew Title: Synthetically Simple, Highly Resilient Hydrogels Published: Biomacromolecules, 2012, vol. 13 pp. 584-588.

(Continued)

*Primary Examiner* — Tae H Yoon
(74) *Attorney, Agent, or Firm* — Jian Zhou

(57) ABSTRACT

The invention provide a class of actinically-crosslinkable amphiphilic prepolymers which comprise at least one polysiloxane segment, at least one polyoxazoline segment, and two terminal ene groups. The present invention is also related to a medical device comprising a silicone hydrogel material obtained from step-growth polymerization of a polymerizable material comprising a prepolymer of the invention and to a method for producing contact lenses from a prepolymer of the invention.

5 Claims, No Drawings

(56) References Cited

U.S. PATENT DOCUMENTS

| | | |
|---|---|---|
| 2008/0143958 A1 | 6/2008 | Medina |
| 2010/0120939 A1 | 5/2010 | Phelan |
| 2010/0296049 A1 | 11/2010 | Justynska |
| 2010/0298446 A1 | 11/2010 | Chang |
| 2011/0063567 A1 | 3/2011 | Domschke |
| 2012/0029111 A1 | 2/2012 | Chang |
| 2012/0088843 A1 | 4/2012 | Chang |
| 2012/0088844 A1 | 4/2012 | Kuyu |
| 2012/0088861 A1 | 4/2012 | Huang |

FOREIGN PATENT DOCUMENTS

| | | |
|---|---|---|
| EP | 0961941 B1 | 4/2002 |
| WO | 0031150 A1 | 6/2000 |

OTHER PUBLICATIONS

Authors: Yu-Chin Lai, Richard Ozark, and Edmond T. Quinn Title: Synthesis and Characterization of a,w-Bis(4-hydroxybutyl) Polydimethylsiloxanes Published: Journal of Polymer Science—Chemistry, vol. 33, (1995) pp. 1773-1782.

\* cited by examiner

ACTINICALLY-CROSSLINKABLE AMPHIPHILIC PREPOLYMERS

This application claims the benefits under 35 USC §119(e) of U.S. provisional application No. 61/737,187 filed Dec. 14, 2012, incorporated by reference in its entirety.

The present invention is related to a class of silicone-containing amphiphilic prepolymers capable of undergoing thiol-ene step-growth polymerization and to methods for making the same. In addition, the present invention is related to medical devices, such as ophthalmic devices, preferably silicone hydrogel contact lenses, made from this class of silicone-containing amphiphilic prepolymers.

BACKGROUND

In recent years, soft silicone hydrogel contact lenses become more and more popular because of their high oxygen permeability and comfort. Most commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (CIBA Vision) based on free-radical chain-growth polymerization, as illustrated in U.S. Pat. Nos. 6,800,225 and 8,088,313, which are incorporated by reference in their entireties. The Lightstream Technology™ involves (1) a lens-forming composition which is preferably a solution of one or more substantially purified prepolymer with ethylenically unsaturated groups and which generally is substantially free of monomers and crosslinking agents with a small molecular weight, (2) reusable molds produced in high precision, and (3) curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time, a high production yield, and elimination of lens extraction with an organic solvent.

U.S. Pat. Nos. 8,003,710, 8,071,703 and 8,283,429 (herein incorporated by reference in their entireties) disclose an improved Lightstream Technology™ based on thiol-ene step-growth polymerization. It is believed that polymeric materials obtained based on step-growth polymerization possesses a network constructed solely by a clean one-on-one chain extension reaction and having relatively large molecular mass between crosslinks. With high molecular mass between crosslinks, the polymeric material can have higher mechanical strength, such as, e.g., tear resistance.

In order to fully utilize the Lightstream Technology™ to make silicone hydrogel contact lenses, there is still a need for new actinically-crosslinkable prepolymers suitable for making silicone hydrogel contact lenses according to the Lightstream Technology™.

SUMMARY OF THE INVENTION

In one aspect, the invention provides an actinically crosslinkable amphiphilic prepolymer. The prepolymer of the invention comprises, along its copolymer chain, at least one polysiloxane segment, at least one polyoxazoline segment, and two terminal ene groups.

In another aspect, the invention provides a medical device, an ophthalmic device, or preferably a soft contact lens made from a polymerizable material including an actinically-crosslinkable amphiphilic prepolymer of the invention.

In a further aspect, the invention provides a method for producing medical device, ophthalmic devices, or preferably soft contact lenses from an actinically-crosslinkable amphiphilic prepolymer of the invention.

The invention also provides a method for preparing an actinically-crosslinkable amphiphilic prepolymer of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a soft contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 1% by weight at room temperature (i.e., a temperature of 20° C. to about 30° C.).

The term "insoluble", in reference to a compound or material in a solvent, means that the compound or material can be dissolved in the solvent to give a solution with a concentration of less than 0.005% by weight at room temperature (as defined above).

As used in this application, the term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

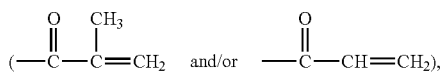

allyl, vinyl, styrenyl, or other C=C containing groups.

As used in this application, the term "(meth)acrylamide" refers to methacrylamide and/or acrylamide and the term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

As used in this application, the term "hydrophilic vinylic monomer" refers to a vinylic monomer capable of forming a homopolymer that is water-soluble or can absorb at least 10 percent by weight water at room temperature.

As used in this application, the term "hydrophobic vinylic monomer" refers to a vinylic monomer which as a homopolymer typically yields a polymer that is insoluble in water and can absorb less than 10 percent by weight water at room temperature.

As used in this application, the term "prepolymer" refers to a polymer that has a weight average molecular weight of greater than 700 Daltons, is soluble in a solvent at room temperature, and contains two or more actinically crosslinkable groups (e.g., ethylenically unsaturated groups or ene groups).

As used in this application, the term "crosslinker" refers to a compound having at least two actinically crosslinkable groups (e.g., ethylenically unsaturated groups or ene groups) and being soluble in a solvent at room temperature. A "crosslinking agent" refers to a crosslinker having a molecular weight of about 700 Daltons or less.

A "polysiloxane" refers to a compound containing one sole polysiloxane segment.

The term "polysiloxane segment" refers to a divalent radical of

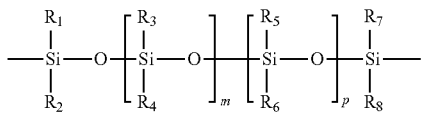

in which $R_1$, $R_2$, $R_3$, $R_4$, $R_5$, $R_6$, $R_7$, and $R_8$, independently of one another, are $C_1$-$C_{10}$ alkyl, $C_1$-$C_4$ alkyl- or $C_1$-$C_4$—alkoxy-substituted phenyl, $C_1$-$C_{10}$ fluoroalkyl, $C_1$-$C_{10}$ fluoroether, $C_6$-$C_{18}$ aryl radical, -alk-$(OCH_2CH_2)_n$—$OR_9$ in which alk is $C_1$-$C_6$-alkylene divalent radical, $R_9$ is hydrogen or $C_1$-$C_5$ alkyl and n is an integer from 1 to 10, m and p independently of each other are an integer of from 0 to 100 and (m+p) is from 1 to 100.

As used in this application, the term "polymer" means a material formed by polymerizing/crosslinking one or more monomers or prepolymers.

As used in this application, the term "molecular weight" of a polymeric material (including monomeric or macromeric materials) or a polymer chain refers to the weight-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —$NH_2$, sulfhydryl, $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

The term "fluid" as used herein indicates that a material is capable of flowing like a liquid.

As used herein, the term "multiple" refers to three or more.

A free radical initiator can be either a photoinitiator or a thermal initiator. A "photoinitiator" refers to a chemical that initiates free radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types of photoinitiators, and Irgacure® types of photoinitiators, preferably Darocure® 1173, and Irgacure® 2959. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a prepolymer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

A "polymerizable UV-absorbing agent" refers to a compound comprising an ethylenically-unsaturated group and a UV-absorbing moiety which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

An "antimicrobial agent", as used herein, refers to a chemical that is capable of decreasing or eliminating or inhibiting the growth of microorganisms such as that term is known in the art. Preferred examples of antimicrobial agent include without limitation silver salts, silver complexes, silver nanoparticles, silver-containing zeolites, and the likes "Silver nanoparticles" refer to particles which are made essentially of silver metal and have a size of less than 1 micrometer.

In this application, an "oxazoline" refers to a compound of

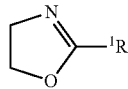

in which $^1R$ is hydrogen, methyl or ethyl group.

A "polyoxazoline segment" refers to a divalent radical of

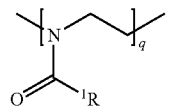

in which $^1R$ is hydrogen, methyl or ethyl group, and q is an integer from 3 to 200.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t[in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The term "water soluble or processable" in reference to a prepolymer of the invention means that the prepolymer has a water solubility and/or dispersity of from about 1% to about 40% by weight at room temperature (about 22° C. to about 28° C.).

The term "water solubility and/or dispersity" in reference to a prepolymer of the invention means the concentration (weight percentage) of the prepolymer dissolved and/or dispersed in water at room temperature (about 22° C. to about 28° C.) to form a transparent aqueous solution or a slightly hazy aqueous solution having a light transmissibility of 85% or greater in the range between 400 to 700 nm.

The term "ophthalmically compatible solvent" refers to a solvent which may be in intimate contact with the ocular environment for an extended period of time without significantly damaging the ocular environment and without significant user discomfort. "Ocular environment", as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications. Preferred examples of ophthalmically compatible solvents include without limitation water, 1,2-propylene glycol, a polyethyleneglycol having a molecular weight of about 400 Daltons or less, and combinations thereof.

A "coupling reaction" in this patent application is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof.

Non-limiting examples of coupling reactions under various reaction conditions between a pair of matching co-reactive functional groups selected from the group preferably consisting of amino group (—NHR' in which R' is H or $C_1$-$C_4$ alkyl), hydroxyl group, carboxyl group, acid halide group (—COX, X═Cl, Br, or I), acid anhydrate group, aldehyde group, azlactone group, isocyanate group, epoxy group, aziridine group, and thiol group, are given below for illustrative purposes. An amino group reacts with aldehyde group to form a Schiff base which may further be reduced; an amino group —NHR' reacts with an acid chloride or bromide group or with an acid anhydride group to form an amide linkage (—CO—NR'— with R' as defined above); an amino group —NHR' reacts with an isocyanate group to form a urea linkage (—NR'—C(O)—NH— with R' as defined above); an amino group —NHR' reacts with an epoxy or aziridine group to form an amine bond (—C—NR'— with R' as defined above); an amino group —NHR' reacts (ring-opening) with an azlactone group to form an alkylene-diamido linkage (—C(O)NH-alkylene-C(O)NR'— with R' as defined above); an amino group —NHR' reacts with a carboxylic acid group in the presence of a coupling agent—carbodiimide (e.g., 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof) to form an amide linkage; an amino group —NHR' reacts with a N-hydroxysuccinimide ester group to form an amide linkage; a hydroxyl reacts with an isocyanate to form a urethane linkage; a hydroxyl reacts with an epoxy or aziridine to form an ether linkage; a hydroxyl reacts with an acid chloride or bromide group or with an acid anhydride group to form an ester linkage; an hydroxyl group reacts with an azlactone group in the presence of a catalyst to form an amidoalkylenecarboxy linkage (—C(O)NH-alkylene-C(O)—O—); a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thiolester linkage; a thiol group reacts with an azlactone group in the presence of a catalyst to form a linkage (—C(O)NH—$CR_3R_4$—$(CH_2)p$-C(O)—S—). A thiol group reacts with a vinyl group based on thiol-ene reaction under thiol-ene reaction conditions to form a thioether linakge (—S—). A thiol group reacts with an acryloyl or methacryloyl group based on Michael Addition under appropriate reaction conditions to form a thioether linkage.

It is also understood that coupling agents with two reactive functional groups may be used in the coupling reactions. A coupling agent having two reactive functional groups can be a diisocyanate, a di-acid halide, a di-carboxylic acid compound, a di-acid halide compound, a di-azlactone compound, a di-epoxy compound, a diamine, or a diol. A person skilled in the art knows well to select a coupling reaction (e.g., anyone described above in this application) and conditions thereof to prepare a polysiloxane terminated with one or more ethylenically unsaturated groups. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, epoxy, aziridine, carboxylic acid, acid halide or azlactone groups or combinations thereof.

Any suitable $C_4$-$C_{24}$ diisocyanates can be used in the invention. Examples of preferred diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

Any suitable diamines can be used in the invention. An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, and isophorone diamine.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable di-epoxy compounds can be used in the invention. Examples of preferred di-epoxy compounds are neopentyl glycol diglycidyl ether, 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, and combinations thereof. Such di-epoxy compounds are available commercially (e.g., those DENACOL series di-epoxy compounds from Nagase ChemteX Corporation).

Any suitable $C_2$-$C_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, and combination thereof.

Any suitable $C_3$-$C_{24}$ di-carboxylic acid compounds can be used in the invention. Examples of preferred di-carboxylic acid compounds include without limitation a linear or branched $C_3$-$C_{24}$ aliphatic dicarboxylic acid, a $C_5$-$C_{24}$ cycloaliphatic or aliphatic-cycloaliphatic dicarboxylic acid, a $C_6$-$C_{24}$ aromatic or aralphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

Any suitable $C_{10}$-$C_{24}$ di-azlactone compounds can be used in the invention. Examples of such diazlactone compounds are those described in U.S. Pat. No. 4,485,236 (herein incorporated by reference in its entirety).

The reactions conditions for the above described coupling reactions are taught in textbooks and are well known to a person skilled in the art.

The term "ethylenically functionalize" or ethylenically functionalization" in reference to a compound or polymer or copolymer having one or more reactive functional groups (e.g., amine, hydroxyl, carboxyl, isocyanate, anhydride, aziridine, azlactone, and/or epoxy groups) means a process or product thereof in which one or more ethylenically unsaturated groups are covalently attached to the functional groups of the compound or polymer or copolymer by reacting an ethylenically functionalizing vinylic monomer with the compound or polymer or copolymer under coupling reaction conditions.

An "ethylenically functionalizing vinylic monomer" throughout of this patent application refers to a vinylic monomer having one reactive functional group capable of participating in a coupling (or crosslinking) reaction known to a person skilled in the art. Any vinylic monomer having a hydroxy, amino, carboxyl, epoxy, aziridine, acid-chloride, isocyanate group, which is correactive with isocyanate, amine, hydroxyl, carboxy, or epoxy groups of a polysiloxane in the absence or presence of a coupling agent (those described above), can be used in ethylenically functionalizing the polysiloxane. Examples of ethylenically-functionalizing vinylic monomers include without limitation $C_2$ to $C_6$ hydroxylalkyl (meth)acrylate, $C_2$ to $C_6$ hydroxyalkyl(meth)acrylamide, allylalcohol, allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl(meth)acrylamide, $C_1$-$C_6$ alkylamino-$C_2$-$C_6$ alkyl(meth)acrylamide, acrylic acid, $C_1$-$C_4$ alkylacrylic acid (e.g., methacrylic ethylacrylic acid, propylacrylic acid, butylacrylic acid), N—[tris(hydroxymethyl)-methyl]acrylamide, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, aziridinyl $C_1$-$C_{12}$ alkyl (meth)acrylate (e.g., 2-(1-aziridinyl)ethyl (meth)acrylate, 3-(1-aziridinyl)propyl (meth)acrylate, 4-(1-aziridinyl)butyl (meth)acrylate, 6-(1-aziridinyl)hexyl (meth)acrylate, or 8-(1-aziridinyl)octyl (meth)acrylate), glycidyl (meth)acrylate, vinyl glycidyl ether, allyl glycidyl ether, (meth)acrylic acid halide groups (—COX, X=Cl, Br, or I), $C_1$ to $C_6$ isocyanatoalkyl (meth)acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), and combinations thereof.

An "ene-containing group" refers to a mono-valent or divalent radical contains a carbon-carbon double which is not directly linked to a carbonyl group (—CO—), a benzene ring, nitrogen atom, or oxygen atom.

In general, the invention is directed to a class of actinically crosslinkable silicone-containing prepolymers comprising at least one polysiloxane segment, at least one polyoxazoline segment, and two terminal ene groups. Such prepolymers can be used to prepare medical devices, ophthalmic devices, or preferably silicone hydrogel contact lenses, in particularly according to the Lightstream Technology™ (CIBA Vision).

In one aspect, the invention provides an actinically crosslinkable prepolymer comprising at least one polysiloxane segment, at least one polyoxazoline segment, and two terminal ene groups (preferably in the copolymer chain of the prepolymer), wherein the prepolymer is defined by formula (1)

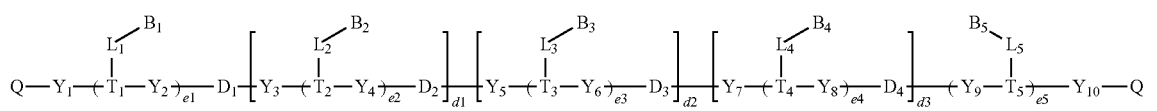

(1)

in which $B_1$, $B_2$, $B_3$, $B_4$, and $B_5$ independent of one another are a linear hydrophilic polymer chain having a molecular weight of about 10000 Daltons or less (preferably about 7500 daltons or less, more preferably about 5000 daltons or less, even more preferably about 2500 Daltons or less, most preferably about 1000 Daltons or less) and comprising at least about 80%, preferably at least about 90%, more preferably at least about 95%, even more preferably at least about 98% by weight of hydrophilic monomeric units selected from the group consisting of oxazoline units (i.e., N—$C_1$-$C_3$ acyl ethylenimine units), ethyleneoxide units, (meth)acrylamide units, N—$C_1$-$C_3$ alkyl(meth)acrylamide units, N,N-di-($C_1$-$C_3$ alkyl) (meth)acrylamide units, N-vinylpyrrole units, N-vinyl-2-pyrrolidone units, 4-vinylpyridine units, mono-$C_1$-$C_4$ alkoxy-, mono-(meth)acryloyl terminated polyethyleneglycol units having a molecular weight of 600 Daltons or less, di($C_1$-$C_3$ alkyl amino)($C_2$-$C_4$ alkyl) (meth)acrylate units, N—$C_1$-$C_4$ alkyl-3-methylene-2-pyrrolidone units, N—$C_1$-$C_4$ alkyl-5-methylene-2-pyrrolidone units, N-vinyl $C_1$-$C_6$ alkylamide units, N-vinyl-N—$C_1$-$C_6$ alkyl amide units, and combinations thereof;

d1, d2, d3 independent of one another are an integer from 0 to 20 and (d1-Fd2-Fd3)≥1;

$D_1$, $D_2$, $D_3$, and $D_4$ independently of one other are a divalent group of formula (2)

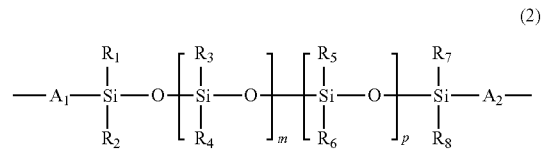

(2)

in which $A_1$ and $A_2$ independent of each other are a direct bond, a linear or branched $C_1$-$C_{10}$ alkylene divalent radical, —$(CH_2CH_2O)_{r1}$—$CH_2CH_2$— in which r1 is an integer of 1 to 20, or a $C_1$-$C_7$ alkyleneoxy-$C_1$-$C_7$ alkylene divalent radical, $R_1$, $R_2$, $R_3$, $R_4$, $R_5$, $R_6$, $R_7$, and $R_8$, independently of one another, are $C_1$-$C_{10}$ alkyl, $C_1$-$C_4$ alkyl- or $C_1$-$C_4$— alkoxy-substituted phenyl, $C_1$-$C_{10}$ fluoroalkyl, $C_1$-$C_{10}$ fluoroether, $C_6$-$C_{18}$ aryl radical, -alk-$(OCH_2CH_2)_n$—$OR_9$ in which alk is $C_1$-$C_6$-alkylene divalent radical, $R_9$ is hydrogen or $C_1$-$C_5$ alkyl and n is an integer from 1 to 10, m and p independently of each other are an integer of from 0 to 100 and (m+p) is from 1 to 100;

e1, e2, e3, e4, e5 independent of one other are an integer from 0 to 3 and (e1+e2+e3+e4+e5)≥1;

$L_1$, $L_2$, $L_3$, $L_4$, and $L_5$ independent of one another are a direct bond or a divalent radical of —$Z_1$—$X_1$—$Z_1$—$X_2$—$Z_3$—$X_3$—$Z_4$— in which $X_1$, $X_2$, and $X_3$ independent of one other are a linkage selected from the group consisting of a direct bond, —O—, —NR'— in which R' is H or $C_1$-$C_4$ alkyl, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—$Z_0$—NH—C(O)—NH—, —O—C(O)—NH—$Z_0$—NH—C(O)—O—, —O—C(O)—NH—$Z_0$—NH—C(O)—NH—, and —NH—C(O)—NH—$Z_0$—NH—C(O)—O—, $Z_0$ is a linear or branched $C_2$-$C_{12}$ alkylene divalent radical or a $C_5$-$C_{45}$ cycloaliphatic or aliphatic-cycloaliphatic divalent radical optionally containing therein one or more linkages of —O—, —NR'— with R' as defined above, —S— and —C(O)—, $Z_1$, $Z_2$, $Z_3$, and $Z_4$ independent of one other are a direct bond, a linear or branched $C_1$-$C_{12}$ alkylene divalent radical optionally containing therein one or more linkages of —O—, —NR'— with R' as defined above, —S— and —C(O)—, —$(CH_2CH_2O)_{r1}$—$CH_2CH_2$— with r1 as defined above, or a $C_5$-$C_{45}$ cycloaliphatic or aliphatic-cycloaliphatic divalent radical optionally containing therein one or more linkages of —O—, —NR'— with R' as defined above, —S— and —C(O)—;

$Y_1$, $Y_2$, $Y_3$, $Y_4$, $Y_4$, $Y_6$, $Y_7$, $Y_8$, $Y_9$, and $Y_{10}$ each comprise at least one urethane linkage (—O—C(O)—NH—) and independent of each other are a divalent radical of —$Z_1$—$X_1$—$Z_2$—$X_2$—$Z_3$—$X_3$—$Z_4$— as defined above, or a divalent radical of formula (3)

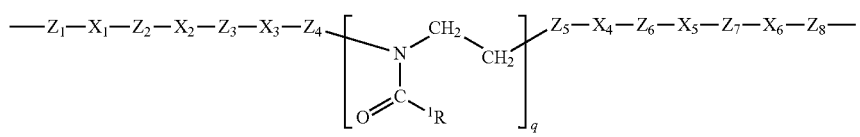

in which $Z_1$ to $Z_4$ and $X_1$ to $X_3$ are as defined above, $X_4$, $X_5$, and $X_6$ independent of one other are a linkage selected from the group consisting of a direct bond, —O—, —NR'— with R' as defined above, —C(O)—NH—, —NH—C(O)—, —NH—C(O)—NH—, —O—C(O)—NH—, —S—, —NH—C(O)—O—, —C(O)—O—, —C(O)—, —NH—C(O)—NH—$Z_0$—NH—C(O)—NH— with $Z_0$ as defined above, —C(O)—NH—$Z_0$—NH—C(O)—O— with $Z_0$ as defined above, —O—C(O)—NH—$Z_0$—NH—C(O)—NH— with $Z_0$ as defined above, and —NH—C(O)—NH—$Z_0$—NH—C(O)—O— with $Z_0$ as defined above, $Z_5$, $Z_6$, $Z_7$, and $Z_8$ independent of one other are a direct bond, a linear or branched $C_1$-$C_{12}$ alkylene divalent radical optionally containing therein one or more linkages of —O—, —NR'— with R' as defined above, —S— and —C(O)—, —$(CH_2CH_2O)_{r1}$—$CH_2CH_2$— with r1 as defined above, or a $C_5$-$C_{45}$ cycloaliphatic or aliphatic-cycloaliphatic divalent radical optionally containing therein one or more linkages of —O—, —NR'— with R' as defined above, —S— and —C(O)—, $^1R$ is hydrogen, methyl or ethyl group, and q is an integer from 3 to 200;

$T_1$, $T_2$, $T_3$, $T_4$, and $T_5$ independent of one another are an aliphatic or cycloaliphatic or aliphatic-cycloaliphatic trivalent radical which has up to 15 carbon atoms and can be interrupted by —O—, —NR'— with R' as defined above, —C(O)— and/or —S—; and Q is defined by any one of formula (I)-(III)

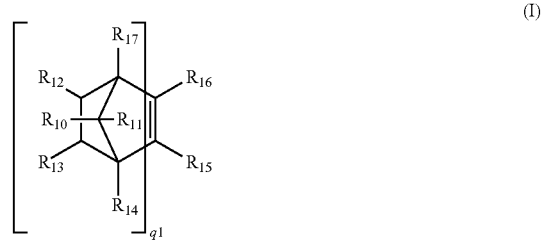

in which (i) $R_{10}$-$R_{17}$, independent of each other, are hydrogen, $C_1$-$C_{10}$ alkene divalent radical, $C_1$-$C_{10}$ alkyl, or —$(R_{18})_{a1}$—$(X_7)_{b1}$—$R_{19}$ in which $R_{18}$ is $C_1$-$C_{10}$ alkene divalent radical, $X_7$ is an ether linkage, a urethane linkage, a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a1 and b1 independent of each other is zero or 1, q1 is an integer number from 1 to 3, provided that only one of $R_{10}$-$R_{17}$ are divalent radicals; (ii) $R_{20}$-$R_{25}$, independent of each other, are hydrogen, $C_1$-$C_{10}$ alkene divalent radical, $C_1$-$C_{10}$ alkyl, or —$(R_{18})_{a1}$—$(X_7)_{b1}$—$R_{19}$ in which $R_{18}$, $R_{19}$, $X_7$, a1, and b1 are as defined above, provided that at least one of $R_{20}$-$R_{25}$ are divalent radicals, t1 and t2 independent of each other are integer number from 0 to 9, provided that (t1+t2) is an integer number from 2 to 9; (iii) $R_{26}$ is hydrogen, or $C_1$-$C_{10}$ alkyl; $R_{27}$ and $R_{28}$ independent of each other are hydrogen, $C_1$-$C_{10}$ alkyl, or —$(R_{18})_{a1}$—$(X_7)_{b1}$—$R_{19}$ in which $R_{18}$, $R_{19}$, $X_7$, a1, and b1 are as defined above, $R_{29}$ is a $C_1$-$C_{10}$ alkene divalent radical.

In a preferred embodiment, the prepolymer is defined by formula (4)

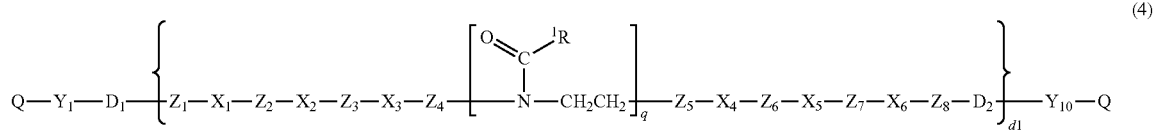

in which Q, $D_1$, $D_2$, $X_1$ to $X_6$, $Z_1$ to $Z_8$, $^1R$, q, $Y_1$, and $Y_{10}$ are as defined above, and d1 is an integer from 1 to 20.

In another preferred embodiment, the prepolymer is defined by formula (5)

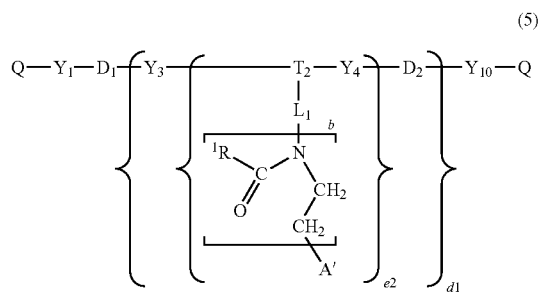

in which Q, $D_1$, $D_2$, $L_1$, $T_2$, $^1R$, q, $Y_1$, $Y_3$, $Y_4$, and $Y_{10}$ are as defined above, e2 is an integer from 1 to 3, d1 is an integer from 1 to 20, and A' is $C_1$-$C_4$ alkoxy.

In another preferred embodiment, the prepolymer is defined by formula (6)

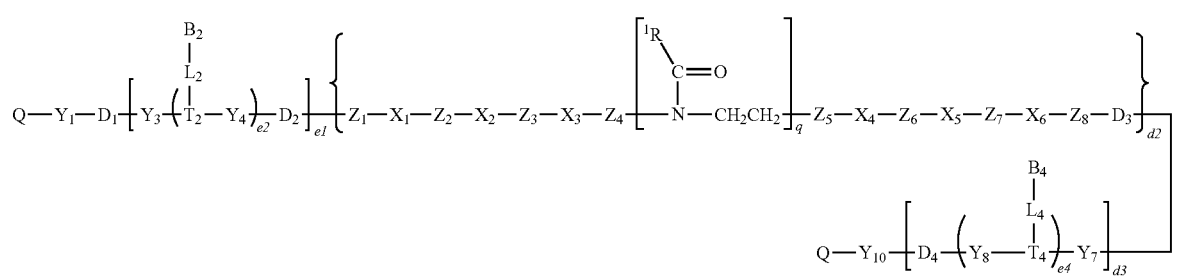

in which Q, $D_1$ to $D_4$, $X_1$ to $X_6$, e2, e4, d1, d3, $Z_1$ to $Z_8$, $^1R$, q, $L_2$, $L^4$, $T_2$, $T_4$, $B_2$, $B_4$, $Y_1$, $Y_3$, $Y_4$, $Y_7$, $Y_8$, and $Y_{10}$ are as defined above, d2 is an integer from 1 to 20. Preferably, d2 is an integer from 1 to 20, and $B_2$ and $B_4$ independent of each other are a linear hydrophilic polymer chain having a molecular weight of about 10000 Daltons or less (preferably about 7500 daltons or less, more preferably about 5000 daltons or less, even more preferably about 2500 Daltons or less, most preferably about 1000 Daltons or less) and comprising at least about 90%, preferably at least about 95%, more preferably at least about 98% by weight of hydrophilic monomeric units selected from the group consisting of oxazoline units (i.e., N—$C_1$-$C_3$ acylethylenimine units), ethyleneoxide units, (meth)acrylamide units, N,N-dimethyl(meth)acrylamide units, N-vinylpyrrolidone, N,N-dimethyl(meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

A prepolymer of the invention can be obtained by (a) polymerizing a reactive mixture comprising at least one polysiloxane compound terminated with two first reactive functional groups, a polyoxazoline terminated with two second reactive functional groups and/or a polyoxazoline with one sole first reactive terminal group having two third reactive functional groups, and optionally a hydrophilic polymer with one sole second reactive terminal group having two fourth reactive functional groups, in the presence or absence of a coupling agent under coupling reaction conditions to form an intermediary copolymer terminated with two reactive functional groups which independently of each other are one of the first, second, third and fourth functional group, and (b) covalently attaching an ene-containing compound with a fifth reactive functional group correactive with one of the two reactive functional groups of the intermediary copolymer in the presence of absence of a coupling agent to form a covalent linkage, wherein the first to fifth reactive functional groups independently of one another are selected from the group consisting of hydroxyl group (—OH), amino group (—NHR'), carboxyl group (—COOH), epoxy group, isocyanate group, and combinations thereof, preferably from the group consisting of hydroxyl, isocyanate, and combination thereof.

Various polysiloxane compounds terminated with two reactive functional groups selected from the group consisting of hydroxyl groups (—OH), amino groups (—NHR'), carboxyl groups (—COOH), epoxy groups, isocyanate groups, thiol groups, and combinations thereof can be obtained from commercial suppliers (e.g., from Shin Etsu, Gelest, Inc, or Fluorochem). Otherwise, one skilled in the art will know how to prepare such difunctional group-terminated polysiloxanes according to procedures known in the art and described in Journal of Polymer Science—Chemistry, 33, 1773 (1995) (herein incorporated by reference in its entirety). Examples of commercially available di-functional polysiloxane include without limitation, di-epoxypropoxypropyl-terminated polysiloxane, di-hydroxyethoxypropyl-terminated polysiloxane, di-hydroxyl(polyethyleneoxy)propyl-terminated polysiloxane, dicarboxydecyl-terminated polysiloxane, dicarboxypropyl-terminated polysiloxane, di-caprolactone terminated polysiloxane, di-N-ethylaminopropyl terminated polysiloxane, and combinations thereof (e.g., from Shin Etsu, Gelest, etc.).

A person skilled in the art will know well how to convert one terminal reactive functional group into another desired terminal reactive functional group (e.g., hydroxyl or isocyanate group). For example, a terminal thiol group can be converted into a terminal hydroxyl group by reacting it with $C_2$-$C_4$ hydroxyalkyl (meth)acrylate, $C_2$-$C_4$ hydroxyalkyl (meth)acrylamide or allyl alcohol under Michael Addition or thiol-ene reaction conditions; a terminal amino group can be converted into a terminal hydroxyl group by reacting with glycolic acid; a terminal amino group can be converted into a terminal isocyanate group by reacting with a diisocyanate in the presence of EDC (1-ethyl-3-(3-dimethylaminopropyl) carbodiimide); a terminal carboxyl group can be converted into a terminal hydroxyl group by reacting with 2-aminoethanol in the presence of EDC.

A polyoxazoline with two second functional terminal groups can be prepared according to any known ring-opening polymerization of oxazoline. For examples, a polyoxazoline with two terminal hydroxyl groups can be obtained by ring-opening polymerization of oxazoline in the presence of a di-halogen substituted hydrocarbon (e.g., trans-1,4-dichloro-2-butene, trans-1,4-dibromo-2-butene, 1,4-bis(bromomethyl)benzene, etc.) as an initiator and subsequent hydrolysis in water (see Scheme I). Alternatively, a polyoxazoline with two terminal hydroxyl groups can be obtained by (1) ring-opening polymerization of oxazoline in the presence of allyl bromide, (2) hydrolysis to form a polyoxazoline with one hydroxyl group and one allyl group, and (3) reacting the allyl group with a mercaptoethanol under thiol-ene reaction conditions (see Scheme II). It is understood that if desired, hydroxyl group can be converted into another reactive functional as discussed above.

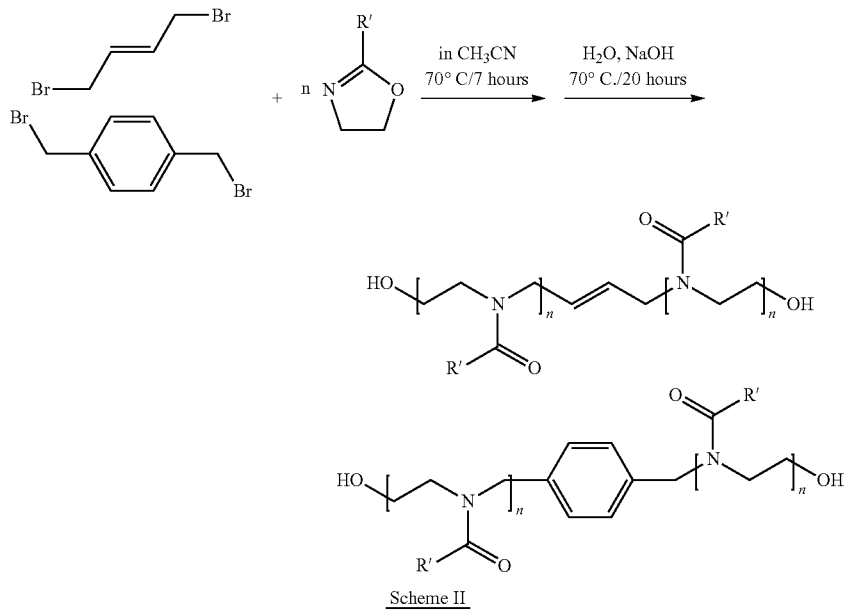

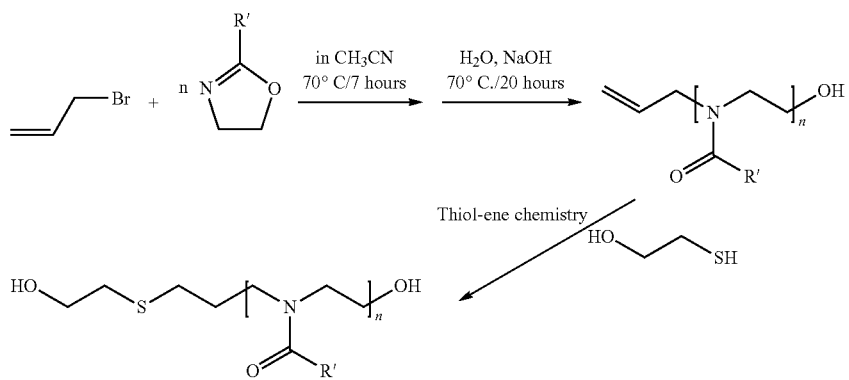

A polyoxazoline with one sole bisfunctional terminal group can be prepared according to any known ring-opening polymerization of oxazoline. For examples, a polyoxazoline with one sole bishydroxyl terminal group can be obtained by (1) ring-opening polymerization of oxazoline in the presence of allyl bromide as an initiator, (2) hydrolysis to form a polyoxazoline with one hydroxyl group and one allyl group, (3) converting the hydroxyl group into alkoxy group by reacting the hydroxy group with a $C_1$-$C_4$ alkyl bromide under strong base conditions, and (4) reacting the allyl group with thiolglycerin under thiol-ene reaction conditions (see Scheme III).

mide, N-vinyl-N—$C_1$-$C_6$ alkyl amide, and combinations thereof. In accordance with the invention, the formed hydrophilic polymer is composed of at least about 80% (preferably at least about 90%, more preferably at least about 95%, even more preferably at least about 98%) by weight of hydrophilic monomeric units derived from one or more hydrophilic monomers listed above. It is understood that such a hydrophilic polymer may optionally contain other vinylic monomers, such as a hydrophobic vinylic monomer or a siloxane-containing vinylic monomer known to a person skilled in the art.

Scheme III

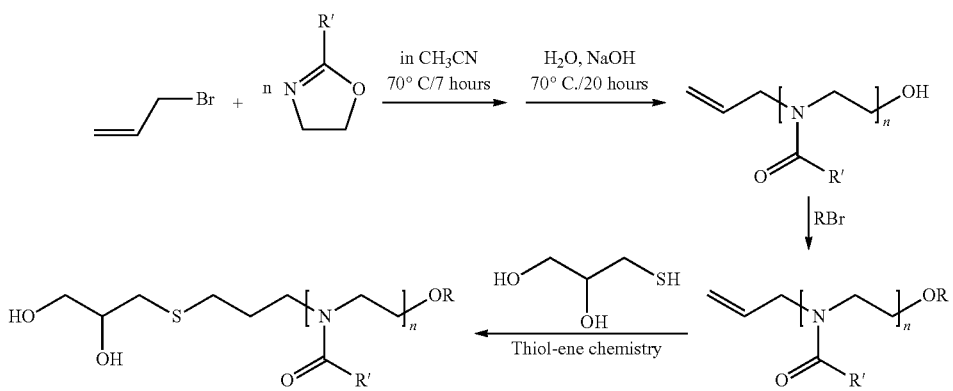

Mono bishydroxyalkyl or bishydroxyalkyloxyalkyl-terminated PEGs are available from commercial source (e.g., Ymer™ N120, a linear difunctional polyethylene glycol monomethyl ether, from Perstorp).

Hydrophilic polymers with one sole reactive terminal group having two reactive functional groups can be prepared according to procedures similar to those described in U.S. Pat. No. 6,218,508, herein incorporated by reference in its entirety. For example, polymerization of a polymerizable mixture comprising one or more hydrophilic vinylic monomers without reactive functional group other than ethylenically-unsaturated group (i.e., primary or secondary amino group, hydroxyl group, isocyanate group, carboxyl group, or epoxy group) and a chain transfer agent having two reactive functional groups (e.g., thioglycrin) can result in formation of a hydrophilic polymer with one sole reactive terminal group having two hydroxyl groups. Generally, the molar ratio of chain transfer agent to that of one or more hydrophilic vinylic monomers is from about 1:5 to about 1:100. The molar ratio of chain transfer agent to the hydrophilic vinylic monomer without functional group is selected to obtain a polymer or copolymer with a molecular weight of from about 500 to about 500,000, preferably from about 1000 to about 100,000, more preferably from about 1500 to about 100,000 Daltons.

Examples of preferred hydrophilic vinylic monomers for forming a hydrophilic polymer with one sole reactive terminal group having two reactive functional groups include without limitation (meth)acrylamide, N—$C_1$-$C_3$ alkyl(meth)acrylamide, N,N-di-($C_1$-$C_3$ alkyl)(meth)acrylamide, N-vinylpyrrole, N-vinyl-2-pyrrolidone, 4-vinylpyridine, mono-$C_1$-$C_4$ alkoxy-, mono-(meth)acryloyl terminated polyethyleneglycol having a molecular weight of 600 Daltons or less, di($C_1$-$C_3$ alkyl amino)($C_2$-$C_4$ alkyl) (meth)acrylate, N—$C_1$-$C_4$ alkyl-3-methylene-2-pyrrolidone, N—$C_1$-$C_4$ alkyl-5-methylene-2-pyrrolidone, N-vinyl $C_1$-$C_6$ alkyla- Any mercaptans having 2 to 24 carbon atoms and two reactive functional groups selected from the group consisting of amino (—NHR' with R' as defined above), hydroxyl, carboxyl, and combinations thereof can be used in the invention to prepare a hydrophilic polymer with one sole reactive terminal group having two reactive functional groups. Examples of such mercaptans include without limitation mercaptoglycerol, 2-Mercapto-pyrimidine-4,6-diol; cysteine; 4-amino-5-mercapto-pentanoic acid, 2-mercapto-4-amino-6-hydroxy-pyrimidine, 2-mercapto-succinic acid, 3-mercapto-2-(methylamino)propanoic acid, 2-mercapto-4,5-dihydro-1 h-imidazole-4,5-diol, 3-mercaptotyramine, mercaptopropanediol, 2-mercaptomethylglutaric acid, 3-mercapto-DL-valine hydrochloride, and combinations thereof.

Hydrophilic polymers with one sole reactive terminal group having two reactive functional groups can also be prepared from any linear hydrophilic polymers having one sole ethylenically unsaturated group or one sole reactive functional group.

A hydrophilic polymer with sole ethylenically unsaturated group can be reacted with a mercaptan with two reactive functional groups other than thiol group (e.g., thiolglycerin, or any one described above) under Michael Addition or thiol-ene reaction conditions to prepare a hydrophilic polymer with one sole reactive terminal group having two reactive functional groups.

A hydrophilic polymer with sole ethylenically unsaturated group can be reacted with a $C_2$-$C_{20}$ compounds having three reactive functional groups (at least two different types of reactive functional groups) under a coupling reaction conditions in the presence of absence of a coupling agent. Examples of such $C_2$-$C_{20}$ compounds having three reactive functional groups (which can be identical to or different from one other) include without limitation 3-amino-1,2-propanediol, 2-amino-1,3-propanediol, 2-amino-2-methylpropane-1,3-diol, α-aminoadipic acid, 2,3-dihydroxy-3-methylpentanoic acid, glyceric acid, 4-amino-2-hydroxybutanoic acid, 3-amino-2-hydroxypropionic acid, serine, threonine, lysine, aspartate, glutamate, 3-hydroxy-3-methylglutaric acid, malic acid, 2-hydroxyglutaric acid. A person skilled in the art understand well how to chose a coupling reaction based on selectivity and/or differential reactivity of a given functional group. For example, the amine group of 3-amino-1,2-propanediol can react with the sole carboxylic group of a monofunctionalized linear or 3-arm hydrophilic polymer in the presence of a carbodiimide (i.e., 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide) according to well-known carbodiimide-assisted coupling reaction, so as to form a hydrophilic polymer with one sole reactive terminal group having two hydroxyl groups.

Mono-ethylenically unsaturated group-terminated polyethyleneglycols (PEG's) are available from commercial sources. A monoethylenically unsaturated group-terminated hydrophilic polymer can be prepared by ethylenically functionalizing of a hydrophilic polymer having one sole reactive functional group selected from the group consisting of amino group, hydroxyl group, acid chloride group, carboxyl group, isocyanate group, anhydride, and epoxy group. In accordance with the invention, ethylenically functionalizing of a monofunctional group-terminated hydrophilic polymer can be carried out by covalently attaching ethylenically unsaturated groups to the functional groups (e.g., amine, hydroxyl, carboxyl, isocyanate, anhydride, and/or epoxy groups) of the mono-functional group terminated hydrophilic polymer by using an ethylenically functionalizing vinylic monomer (any one of those described above).

Various monofunctional terminated PEGs can be obtained from commercial sources, e.g., Shearwater Polymers, Inc. and Polymer Sources™. Preferred monofunctional-terminated PEGs are those PEGs with one amino, hydroxyl, acid chloride, or epoxy group at one terminus and a methoxy or ethoxy group at the other terminus. Various monofunctional polyvinylpyrrolidones (PVPs) with one terminal hydroxy, carboxyl or thiol group can be obtained from commercial sources, e.g., Polymer Sources™.

Monofunctional group-terminated linear hydrophilic polymers of one or more hydrophilic vinylic monomers free of any reactive functional group (other than ethylenically unsaturated group) can be prepared according to procedures similar to those described in U.S. Pat. No. 6,218,508, herein incorporated by reference in its entirety. For example, one or more hydrophilic vinylic monomers without functional group (i.e., primary amino group, hydroxyl group, isocyanate group, carboxyl group, or epoxy group) and a chain transfer agent (e.g., 2-mercaptoethanol, 2-aminoethanethiol, 2-mercaptopropinic acid, thioglycolic acid, thiolactic acid, or other hydroxymercaptanes, aminomercaptans, or carboxyl-containing mercaptanes) are copolymerized (thermally or actinically) in the presence or absence of an initiator to obtain a monohydroxy-, moncarboxyl-, or monoamine-terminated hydrophilic polymer or copolymer. Generally, the molar ratio of chain transfer agent to that of one or more hydrophilic vinylic monomers is from about 1:5 to about 1:100. The molar ratio of chain transfer agent to the hydrophilic vinylic monomer without functional group is selected to obtain a polymer or copolymer with a molecular weight of from about 500 to about 10,000, preferably from about 1000 to about 7,500 Daltons.

Alternatively, monofunctional group-terminated hydrophilic polymers can be prepared by polymerizing the one or more hydrophilic monomers (free of reactive functional group other than ethylenically unsaturated group) in the presence of a hydroxyl-, amine-, or carboxyl-containing free radical initiator at a molar ratio of intiator to the hydrophilic monomers of from about 1:30 to about 1:700. Examples of initiators with amine, hydroxyl, or carboxy group are azo initiators, such as, e.g., 2,2'-Azobis{2-[1-(2-hydroxyethyl)-2-imidazolin-2-yl]propane}dihydrochloride, 2,2'-Azobis{2-methyl-N-[1,1-bis(hydroxymethyl)-2-hydroxyethyl]propionamide, 2,2'-Azobis[2-methyl-N-(2-hydroxyethyl)propionamide], or 2,2'-Azobis{2-methyl-N-[2-(1-hydroxybutyl)] propionamide}, 2,2'-Azobis(2-methylpropionamide) dihydrochloride, 2,2'-Azobis[N-(2-carboxyethyl)-2-methylpropionamidine]tetrahydrate, or the likes.

Resultant intermediary copolymers terminated with two reactive functional groups can be reacted with an ene-containing compound having one reactive functional group corresponding with the reactive functional groups of the intermediary copolymer in the presence or absence of a coupling agent under coupling reaction conditions.

Examples of ene-containing compounds having one reactive functional group include without limitation, allyl alcohol, allylamine, norbonyl alcohol, 5-norbornene-2-methanol, 5-norbornene-2-carboxylic acid, 5-norbornene-2-methylamine, (2-methyl-1-cyclopentenyl)methanol, 2-cyclopenten-1-ol, 2-cyclopentene-1-acetic acid, 1-amino-3-cyclopentene, 3-cyclopentene-1-carboxylic acid, 3-cyclohexenylmethanol, 1-cyclohexene-1-ethylamine, 1-cyclohexene-1-acetic acid, 3-cyclohexene-1-carboxylic acid, and 1-cyclobutene-1-ethanol.

Schemes IV and V illustrate examples for preparing two preferred amphiphilic prepolymers of formula (1).

Scheme IV

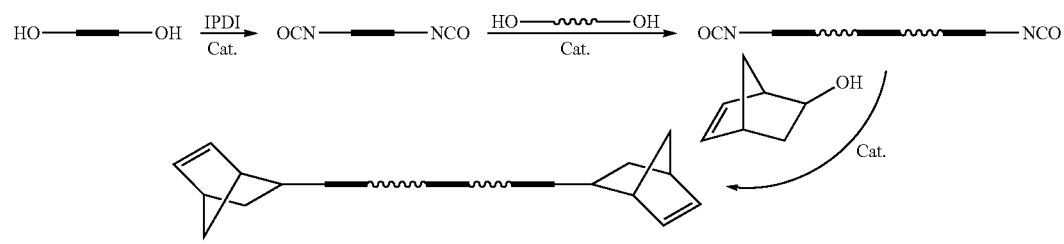

HO━━━OH = HO—PDMS—OH;
IPDI = isophoron diisocyanate
HO━∿∿∿━OH = HO-polyoxazoline-OH Scheme V

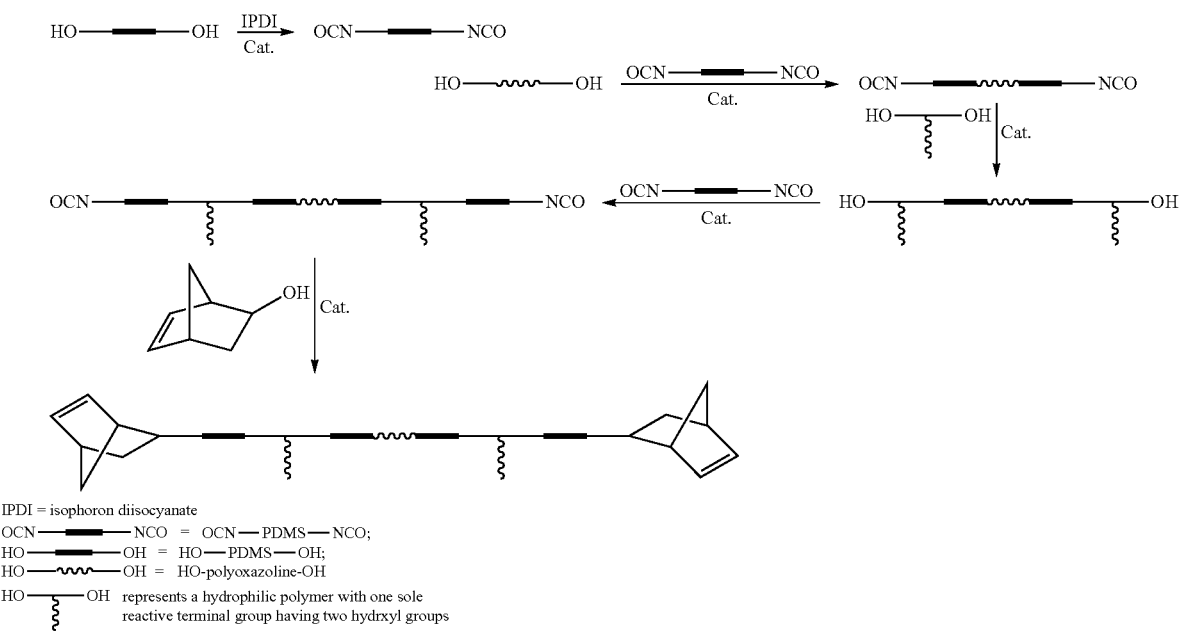

IPDI = isophoron diisocyanate
OCN━■━NCO = OCN—PDMS—NCO;
HO━■━OH = HO—PDMS—OH;
HO━∿∿∿━OH = HO-polyoxazoline-OH
HO—⌇—OH represents a hydrophilic polymer with one sole reactive terminal group having two hydrxyl groups It is understood that the step of polymerizing a reactive mixture for making an intermediary copolymer terminated with two reactive functional groups may be carried out in a one-pot reaction or in series of step-wise reactions.

Preferably, the second, third and fourth reactive functional groups of the polyoxazolines and the hydrophilic polymer can be the same type of reactive functional groups (e.g., either hydroxyl groups or isocyanate groups) but are different from and directly reactive with the two first reactive functional groups of the polysiloxane in the absence of a coupling agent under coupling reaction conditions.

Preferably, resultant prepolymers of the invention is substantially purified in a manner known to a person skilled in the art, for example, by precipitation with organic solvents, such as acetone, filtration and washing, extraction in a suitable solvent, dialysis or ultrafiltration, ultrafiltration being especially preferred. The prepolymers is preferably purified to be in an extremely pure form, for example in the form of concentrated solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known to a person skilled in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. By using such prepolymers in making contact lenses, the obtained lenses will not require subsequent purification such as, for example, costly and complicated extraction of unpolymerized matrix-forming material.

An actinicall-crosslinkable amphiphilic prepolymer of the invention can find particular use in preparing medical devices, ophthalmic devices, in particular contact lenses, with desirable mechanical and physical properties, according to unconventional curing mechanism based on step-growth polymerization. Such unconventional curing mechanism can overcome shortcomings of conventional lens-curing mechanism based on free radical chain-growth polymerization. For example, although free radical chain-growth polymerization is rapid, molecular mass between crosslinks may be quite low and the resultant polymer may have undesirably high E-modulus, low tearing resistance, and/or other non-optimal mechanical or physical properties. It is believed that molecular mass between crosslinks is generally dictated by the molecular mass of starting macromer or prepolymer. As such, in order to enhance the mechanical properties (e.g., tear resistance) of contact lenses, prepolymers with high molecular mass have to be used in compositions for making contact lenses based on free radical chain-growth polymerization. But, prepolymers with high molecular mass will inevitably increase greatly the viscosity of the polymerizable composition and thereby the processing ability (e.g., dosing in molds) of the polymerizable composition is greatly hindered. In addition, resultant polymers form at near-zero monomer conversion because of the chain-growth nature of the polymerization, leading very high viscosity at low conversion and inducing stress in the formed network of a hydrogel.

It should be understood that although various preferred embodiments of the invention may be separately described above, they can be combined in any desirable fashion to arrive at different preferred embodiments of the invention.

In another aspect, the invention provides a medical device, preferably an ophthalmic device, more preferably a soft contact lens. The medical device (preferably the ophthalmic device, more preferably the soft contact lens) of the invention comprises: a silicone hydrogel material that is obtained by actinically crosslinking a polymerizable material, wherein the polymerizable material comprises an actinically crosslinkable prepolymer of formula (1) as defined above and at least one crosslinking/branching agents having multiple thiol groups, based on step-growth polymerization mechanism.

A contact lens of the invention has an oxygen permeability of preferably at least about 40 barrers, more preferably at least about 60 barrers, even more preferably at least about 80 barrers.

A contact lens of the invention has an elastic modulus of from 0.1 MPa to about 2.0 MPa, preferably from about 0.2 MPa to about 1.5 MPa, more preferably from about 0.3 MPa to about 1.2 MPa, even more preferably from about 0.4 MPa to about 1.0 MPa.

A contact lens of the invention further has a water content of from about 15% to about 70%, preferably from about 20% to about 65%, more preferably from about 25% to about 60% by weight when fully hydrated.

All of the various embodiments including preferred embodiments of the prepolymer of the invention described above can be used in this aspect of the invention.

In a further aspect, the invention provides a method for producing soft contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises at least one actinically crosslinkable amphiphilic prepolymer of formula (1) as defined above and at least one crosslinking/branching agents having multiple thiol groups; and actinically irradiating the lens forming material in the cavity to form a contact lens.

In accordance with the invention, a lens-forming (or polymerizable material) is a fluid composition, which can be a solution or a melt at a temperature from about 20° C. to about 85° C. Preferably, a lens-forming material is a solution of at least one prepolymer of formula (1) as defined above, at least one crosslinking/branching agents having multiple thiol groups, and other desirable components in water, or an organic solvent, or a mixture of water and one or more organic solvents.

A solution of at least one prepolymer can be prepared by dissolving the prepolymer and other components in any suitable solvent known to a person skilled in the art. Preferably, a lens-forming material is a solution of all the desirable components in water, 1,2-propylene glycol, a polyethyleneglycol having a molecular weight of about 400 Daltons or less, or a mixture thereof.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

In a preferred embodiment, the lens-forming material further comprises a prepolymer having multiple acryloyl

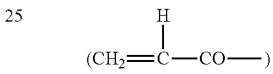

or methacryloyl

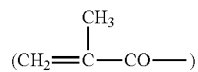

groups. By having both ene-containing groups and acryloyl (or methacryloyl) groups in the fluid composition, one can have two types of polymerization during the curing process: thiol-ene step-growth radical polymerization and free radical chain-growth polymerization. By adjusting these two types of polymerization, one may be able to tail a fluid composition for making contact lenses with a wide range of mechanical and physical properties.

Examples of prepolymers with multiple acryloyl or methacryloyl groups include, but are not limited to, a water-soluble crosslinkable poly(vinyl alcohol) prepolymer described in U.S. Pat. Nos. 5,583,163 and 6,303,687 (incorporated by reference in their entireties); a water-soluble vinyl group-terminated polyurethane prepolymer described in U.S. Patent Application Publication No. 2004/0082680 (herein incorporated by reference in its entirety); derivatives of a polyvinyl alcohol, polyethyleneimine or polyvinylamine, which are disclosed in U.S. Pat. No. 5,849,841 (incorporated by reference in its entirety); a water-soluble crosslinkable polyurea prepolymer described in U.S. Pat. No. 6,479,587 and in U.S. Published Application No. 2005/0113549 (herein incorporated by reference in their entireties); crosslinkable polyacrylamide; crosslinkable statistical copolymers of vinyl lactam, MMA and a comonomer, which are disclosed in EP 655,470 and U.S. Pat. No. 5,712,356 (herein incorporated by reference in their entireties); crosslinkable copolymers of vinyl lactam, vinyl acetate and vinyl alcohol, which are disclosed in EP 712,867 and U.S. Pat. No. 5,665,840 (herein incorporated by reference in their entireties); polyether-polyester copolymers with crosslinkable side chains which are disclosed in EP 932,635 and U.S. Pat. No. 6,492,478 (herein incorporated by reference in their entireties); branched polyalkylene glycol-urethane prepolymers disclosed in EP 958, 315 and U.S. Pat. No. 6,165,408 (herein incorporated by reference in their entireties); polyalkylene glycol-tetra (meth) acrylate prepolymers disclosed in EP 961,941 and U.S. Pat. No. 6,221,303 (herein incorporated by reference in their entireties); crosslinkable polyallylamine gluconolactone prepolymers disclosed in International Application No. WO 2000/31150 and U.S. Pat. No. 6,472,489 (herein incorporated by reference in their entireties); silicone-containing prepolymers are those described in U.S. Pat. Nos. 6,039,913, 7,091,283, 7,238,750, 7,268,189, 7,566,754, 7,956,135, 8,071,696, 8,071,703, 8,071,658, 8,048,968, 8,283, 429, 8,263,679, 8,044,111, and 8,211,955 and in U.S. Published Patent Application No. 2008-0015315 A1, 2011-0063567 A1, 2010-0298446 A1, 2010-0296049 A1, 2012-0088844 A1, 2012-0088843 A1, 2012-0029111A1, 2010-0120939 A1, and 2012-0088861 A1 (herein incorporated by reference in their entireties).

The lens-forming material can optionally but preferably does not comprise one or more vinylic monomer and/or one or more vinylic crosslinking agents (i.e., compounds with two or more ethylenically unsaturated groups and with molecular weight less than 700 Daltons). However, the amount of those components should be low such that the final ophthalmic device does not contain unacceptable levels of unpolymerized monomers and/or vinylic crosslinking agents. The presence of unacceptable levels of unpolymerized monomers and/or vinylic crosslinking agents will require extraction to remove them, which requires additional steps that are costly and inefficient. But preferably, the lens-forming material is substantially free of vinylic monomer and vinylic crosslinking agent (i.e., preferably about 2% or less, more preferably about 1% or less, even more preferably about 0.5% or less by weight of combination of vinylic monomer and vinylic crosslinking agent).

It must be understood that a lens-forming material can also comprise various components, such as, for example, polymerization initiators (e.g., photoinitiator or thermal initiator), a polymerizable UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves.

The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or latching. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, the mold is a reusable mold and the lens-forming material is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

In accordance with the invention, the lens-forming formulation (or composition) can be introduced (dispensed) into a cavity formed by a mold according to any known methods.

After the lens-forming material is dispensed into the mold, it is polymerized to produce a contact lens. Crosslinking may be initiated in the mold e.g. by means of actinic radiation, such as UV irradiation, ionizing radiation (e.g., gamma or X-ray irradiation), preferably by exposing the lens-forming material in the mold to a spatial limitation of actinic radiation to crosslink the lens-forming material.

The crosslinking according to the invention may be carried out in a very short time, e.g. in ≤90 seconds, advantageously in ≤60 seconds, preferably in ≤45 second, more preferably in ≤30 seconds, even more preferably in 5 to 25 seconds.

Where the lens-forming composition comprises a polymerizable UV-absorbing agent (i.e., a UV-absorbing moiety-containing vinylic monomer), a benzoylphosphine oxide photoinitiator is preferably used as the photoinitiator in the invention. Preferred benzoylphosphine oxide photoinitiators include without limitation 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

All of the various embodiments of the actinically crosslinkable amphiphilic prepolymer, and contact lens of the invention described above can be used in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

What is claimed is:
1. An actinically-crosslinkable prepolymer, comprising: at least one polysiloxane segment; at least one polyoxazoline segment which is a divalent radical of

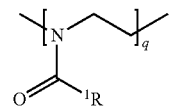

in which $^1R$ is hydrogen, methyl or ethyl group, and q is an integer from 3 to 200;
and two terminal ene groups, wherein the prepolymer is defined by formula (1)

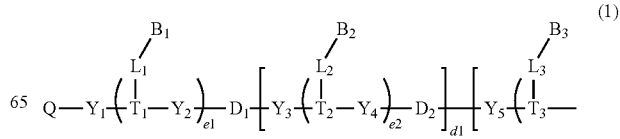

-continued

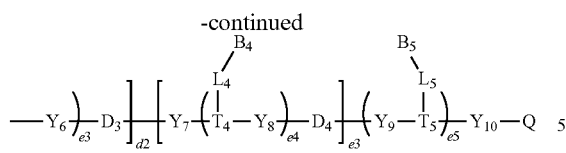

in which
B$_1$, B$_2$, B$_3$, B$_4$, and B$_5$ independent of one another are a linear hydrophilic polymer chain of

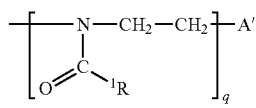

in which $^1$R is hydrogen, methyl or ethyl group, A' is C$_1$-C$_4$ alkoxy and q is an integer from 3 to 200, and have a weight average molecular weight of about 10000 Daltons or less;

d1, d2, d3 independent of one another are an integer from 0 to 20 and (d1+d2+d3)≥1;

D$_1$, D$_2$, D$_3$, and D$_4$ independently of one other are a divalent group of formula (2)

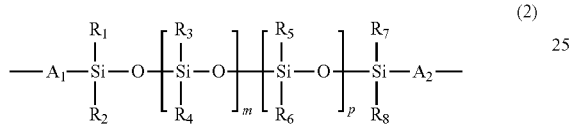

in which A$_1$ and A$_2$ independent of each other are a direct bond, a linear or branched C$_1$-C$_{10}$ alkylene radical, —(CH$_2$CH$_2$O)$_{r1}$—CH$_2$CH$_2$— in which r1 is an integer of 1 to 20, or a C$_1$-C$_7$ alkyleneoxy-C$_1$-C$_7$ alkylene divalent radical, R$_1$, R$_2$, R$_3$, R$_4$, R$_5$, R$_6$, R$_7$, and R$_8$, independently of one another, are C$_1$-C$_{10}$ alkyl, C$_1$-C$_4$ alkyl- or C$_1$-C$_4$-alkoxy-substituted phenyl, C$_1$-C$_{10}$ fluoroalkyl, C$_1$-C$_{10}$ fluoroether, C$_6$-C$_{18}$ aryl radical, -alk-(OCH$_2$CH$_2$)$_n$—OR$_9$ in which alk is C$_1$-C$_6$-alkylene divalent radical, R$_9$ is hydrogen or C$_1$-C$_5$ alkyl and n is an integer from 1 to 10, m and p independently of each other are an integer of from 0 to 100 and (m+p) is from 1 to 100;

e1, e2, e3, e4, e5 independent of one other are an integer from 0 to 3 and (e1+e2+e3+e4+e5)≥1;

L$_1$, L$_2$, L$_3$, L$_4$, and L$_5$ independent of one another are a direct bond or a divalent radical of —Z$_1$—X$_1$—Z$_2$—X$_2$—Z$_3$—X$_3$—Z$_4$— in which
X$_1$, X$_2$, and X$_3$ independent of one other are a linkage selected from the group consisting of a direct bond, —O—, —NR'— in which R' is H or C$_1$-C$_4$ alkyl, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—Z$_0$—NH—C(O)—NH—, —O—C(O)—NH—Z$_0$—NH—C(O)—O—, —O—C(O)—NH—Z$_0$—NH—C(O)—NH—, and —NH—C(O)—NH—Z$_0$—NH—C(O)—O—, Z$_0$ is a linear or branched C$_2$-C$_{12}$ alkylene divalent radical or a C$_5$-C$_{45}$ cycloaliphatic or aliphatic-cycloaliphatic divalent radical optionally containing therein one or more linkages of —O—, —NR'— with R' as defined above, —S— and —C(O)—, Z$_1$, Z$_2$, Z$_3$, and Z$_4$ independent of one other are a direct bond, a linear or branched C$_1$-C$_{12}$ alkylene divalent radical optionally containing therein one or more linkages of —O—, —NR'—, —S— and —C(O)—, —(CH$_2$CH$_2$O)$_{r1}$—CH$_2$CH$_2$— with r1 as defined above, or a C$_5$-C$_{45}$ cycloaliphatic or aliphatic-cycloaliphatic divalent radical optionally containing therein one or more linkages of —O—, —NR'— with R' as defined above, —S— and —C(O)—;

Y$_1$, Y$_2$, Y$_3$, Y$_4$, Y$_4$, Y$_6$, Y$_7$, Y$_8$, Y$_9$, and Y$_{10}$ each comprise at least one urethane linkage (—O—C(O)—NH—) and independent of each other are a divalent radical of —Z$_1$—X$_1$—Z$_2$—X$_2$—Z$_3$—X$_3$—Z$_4$— as defined above, or a divalent radical of formula (3)

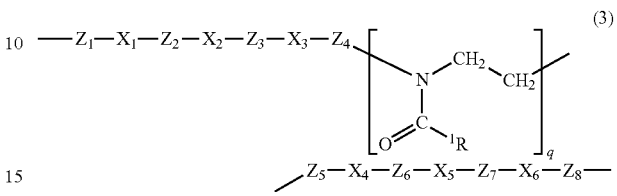

in which
Z$_1$ to Z$_4$ and X$_1$ to X$_3$ are as defined above,
X$_4$, X$_5$, and X$_6$ independent of one other are a linkage selected from the group consisting of a direct bond, —O—, —NR'— with R' as defined above, —C(O)—NH—, —NH—C(O)—, —NH—C(O)—NH—, —O—C(O)—NH—, —S—, —NH—C(O)—O—, —C(O)—O—, —O—C(O)—, —NH—C(O)—NH—Z$_0$—NH—C(O)—NH— with Z$_0$ as defined above, —O—C(O)—NH—Z$_0$—NH—C(O)—O— with Z$_0$ as defined above, —O—C(O)—NH—Z$_0$—NH—C(O)—NH— with Z$_0$ as defined above, and —NH—C(O)—NH—Z$_0$—NH—C(O)—O— with Z$_0$ as defined above, Z$_5$, Z$_6$, Z$_7$, and Z$_8$ independent of one other are a direct bond, a linear or branched C$_1$-C$_{12}$ alkylene divalent radical optionally containing therein one or more linkages of —O—, —NR'— with R' as defined above, —S— and —C(O)—, —(CH$_2$CH$_2$O)$_{r1}$—CH$_2$CH$_2$— with r1 as defined above, or a C$_5$-C$_{45}$ cycloaliphatic or aliphatic-cycloaliphatic divalent radical optionally containing therein one or more linkages of —O—, —NR'— with R' as defined above, —S— and —C(O)—, $^1$R is hydrogen, methyl or ethyl group, and
q is an integer from 3 to 200;

T$_1$, T$_2$, T$_3$, T$_4$, and T$_5$ independent of one another are an aliphatic or cycloaliphatic or aliphatic-cycloaliphatic trivalent radical which has up to 15 carbon atoms and can be interrupted by —O—, —NR'— with R' as defined above, —C(O)— and/or —S—; and Q is defined by any one of formula (I)-(III)

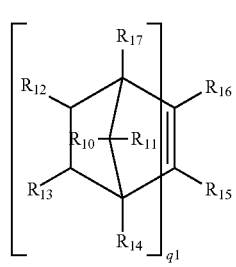

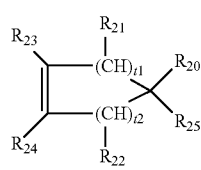

-continued

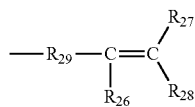
(III)

in which (i) $R_{10}$-$R_{17}$, independent of each other, are hydrogen, $C_1$-$C_{10}$ alkene divalent radical, $C_1$-$C_{10}$ alkyl, or —$(R_{18})_{a1}$—$(X_7)_{b1}$—$R_{19}$ in which $R_{18}$ is $C_1$-$C_{10}$ alkene divalent radical, $X_7$ is an ether linkage, a urethane linkage, a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a1 and b1 independent of each other is zero or 1, q1 is 1, provided that only one of $R_{10}$-$R_{17}$ are divalent radicals; (ii) $R_{20}$-$R_{25}$, independent of each other, are hydrogen, $C_1$-$C_{10}$ alkene divalent radical, $C_1$-$C_{10}$ alkyl, or —$(R_{18})_{a1}$—$(X_7)_{b1}$—$R_{19}$ in which $R_{18}$, $R_{19}$, $X_7$, a1, and b1 are as defined above, provided that at least one of $R_{20}$-$R_{25}$ are divalent radicals, t1 and t2 independent of each other are integer number from 0 to 9, provided that (t1+t2) is an integer number from 2 to 9;
(iii) $R_{26}$ is hydrogen, or $C_1$-$C_{10}$ alkyl; $R_{27}$ and $R_{28}$ independent of each other are hydrogen, $C_1$-$C_{10}$ alkyl, or —$(R_{18})_{a1}$—$(X_7)_{b1}$—$R_{19}$ in which $R_{18}$, $R_{19}$, $X_7$, a1, and b1 are as defined above, $R_{29}$ is a $C_1$-$C_{10}$ alkene divalent radical.

2. The prepolymer of claim 1, being defined by formula (5)

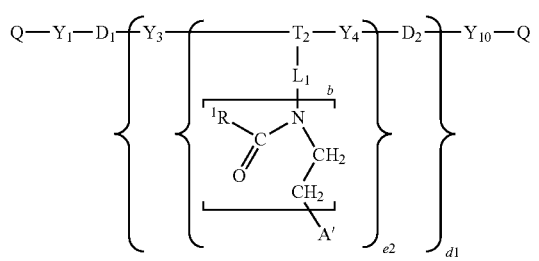
(5)

in which Q, $D_1$, $D_2$, $L_1$, $T_2$, $^1R$, q, $Y_1$, $Y_3$, $Y_4$, and $Y_{10}$ are as defined in claim 1, e2 is an integer from 1 to 3, d1 is an integer from 1 to 20, and A' is $C_1$-$C_4$ alkoxy.

3. The prepolymer of claim 1, being defined by formula (6)

in which Q, $D_1$ to $D_4$, $X_1$ to $X_6$, e2, e4, d1, d3, $Z_1$ to $Z_8$, $^1R$, q, $L_2$, $L_4$, $T_2$, $T_4$, $B_2$, $B_4$, $Y_1$, $Y_3$, $Y_4$, $Y_7$, $Y_8$, and $Y_{10}$ are as defined in claim 1, and d2 is an integer from 1 to 20.

4. The prepolymer of claim 1, wherein Q is defined by formula (I)

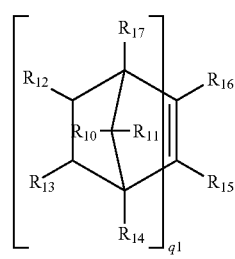
(I)

in which $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage, a urethane linkage, a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_r$ $C_{18}$ alkylaminoalkoxy group, $C_1$-$C_{18}$ carboxyalkoxy group, or $C_1$-$C_{18}$ hydroxyalkoxy group, a and b independent of each other is zero or 1, p is 1, provided that only one of $R_{10}$-$R_{17}$ are divalent radicals.

5. The prepolymer of claim 1, wherein Q is being defined by formula (4)

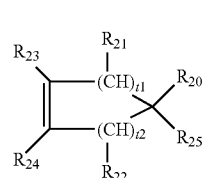
(II)

in which $R_{20}$-$R_{25}$, independent of each other, are hydrogen, $C_1$-$C_{10}$ alkene divalent radical, $C_1$-$C_{10}$ alkyl, or

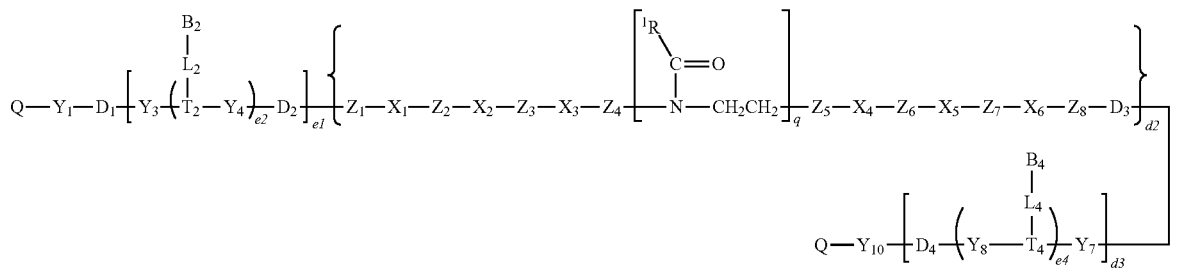
(6)

—$(R_{18})_a$—$(X_1)_b$—$R_{19}$, optionally $R_4$ and $R_9$ are linked through an alkene divalent radical to form a cyclic ring, provided that at least one of $R_{20}$-$R_{25}$ are divalent radicals, t1 and t2 independent of each other are integer number from 0 to 9, provided that (t1+t2) is an integer number from 2 to 9.

\* \* \* \* \*